US010766338B2

(12) United States Patent
Oh et al.

(10) Patent No.: US 10,766,338 B2
(45) Date of Patent: Sep. 8, 2020

(54) HVAC SYSTEM OF VEHICLE WITH BATTERY HEATING AND COOLING

(71) Applicants: HYUNDAI MOTOR COMPANY, Seoul (KR); KIA MOTORS CORPORATION, Seoul (KR)

(72) Inventors: Man Ju Oh, Yongin-si (KR); Jae Woong Kim, Hwaseong-si (KR); Sang Shin Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 154 days.

(21) Appl. No.: 15/943,761

(22) Filed: Apr. 3, 2018

(65) Prior Publication Data
US 2019/0176571 A1    Jun. 13, 2019

(30) Foreign Application Priority Data

Dec. 8, 2017  (KR) .................. 10-2017-0168662

(51) Int. Cl.
*B60H 1/00* (2006.01)
*B60L 58/26* (2019.01)
*B60L 58/27* (2019.01)

(52) U.S. Cl.
CPC ..... *B60H 1/00899* (2013.01); *B60H 1/00278* (2013.01); *B60H 1/00392* (2013.01);
(Continued)

(58) Field of Classification Search
CPC ............ B60H 1/00899; B60H 1/00278; B60H 1/0392; B60H 2001/00307;
(Continued)

(56) References Cited

U.S. PATENT DOCUMENTS

| 5,549,153 A * | 8/1996 | Baruschke | B60H 1/00278 165/42 |
| 2016/0107506 A1* | 4/2016 | Johnston | B60H 1/00921 165/202 |
| 2016/0339767 A1* | 11/2016 | Enomoto | F25B 25/005 |

FOREIGN PATENT DOCUMENTS

| JP | 2019-031109 A | 2/2019 |
| KR | 10-1448656 B1 | 10/2014 |

(Continued)

*Primary Examiner* — Jonathan Bradford
(74) *Attorney, Agent, or Firm* — Morgan, Lewis & Bockius LLP (57) ABSTRACT

An HVAC system of a vehicle includes: a battery line configured to thermally interconnect a first radiator and a high-voltage battery core and provided with a first pump; a refrigerant line having a compressor, a condenser, and an evaporator; an indoor cooling line interconnecting an indoor HVAC cooling core and the evaporator and having a second pump; an indoor heating line thermally interconnecting an indoor HVAC heating core and a condenser and having a third pump; battery cooling lines branching from opposite side points of the high-voltage battery core in the battery line, respectively, and connected to the indoor cooling line; battery heating lines branching from the opposite side points of the high-voltage battery core in the battery line, respectively, and connected to the indoor heating line; and a first valve disposed at one of the opposite branching points in the battery line.

15 Claims, 9 Drawing Sheets

(52) U.S. Cl.
CPC ............... *B60L 58/26* (2019.02); *B60L 58/27* (2019.02); *B60H 2001/00307* (2013.01); *B60H 2001/00928* (2013.01); *B60H 2001/00942* (2013.01)

(58) Field of Classification Search
CPC ........... B60H 2001/00928; B60H 2001/00942; B60L 58/26; B60L 58/27
See application file for complete search history.

(56) References Cited

FOREIGN PATENT DOCUMENTS

| | | |
|---|---|---|
| KR | 10-1787503 B1 | 10/2017 |
| KR | 10-2018-0093184 A | 8/2018 |
| KR | 10-2019-0033115 A | 3/2019 |

\* cited by examiner

HVAC SYSTEM OF VEHICLE WITH BATTERY HEATING AND COOLING

CROSS REFERENCE TO RELATED APPLICATION

The present application claims the benefit of priority to Korean Patent Application No. 10-2017-0168662, filed Dec. 8, 2017, the entire content of which is incorporated herein for all purposes by this reference.

TECHNICAL FIELD

The present disclosure relates to a Heating, Ventilation and Air Conditioning (HVAC) system to be applied to a vehicle, and more particularly, to an HVAC system of a vehicle which can efficiently increase a traveling range of the vehicle by efficiently managing an energy required for indoor HVAC and heating and cooling of a battery.

BACKGROUND

Recently, electric vehicles are emerging as a solution to societal problems such as the implementation of environmentally friendly technologies and energy depletion. An electric vehicle operates using a motor that receives electricity supplied from the battery and outputs power. Therefore, there is no emission of carbon dioxide, the amount of noise is very small, and the energy efficiency of the motor is higher than the energy efficiency of an engine, and thus, the electric vehicle is attracting attention as an environmentally friendly vehicle.

The key technology for implementing such an electric vehicle is the technology related to a battery module. Recently, research toward the weight reduction, miniaturization, and reduction in charging time of a battery has been actively carried out. The battery module can maintain optimal performance and a long service life when used in an optimal temperature environment. However, it is difficult to use in the optimal temperature environment due to the heat generated during driving and external temperature changes.

In addition, since the electric vehicle does not have a waste heat source for the heat generated during the combustion in a separate engine, such as in the case of an internal combustion engine, it is necessary to perform indoor heating of the vehicle in the winter using an electric heating device and to perform warm-up in order to improve the charge and discharge performance of the battery during a cold period. Therefore, a separate coolant heating electric heater is individually configured and used. That is, in order to maintain the optimal temperature environment of the battery module, a cooling and heating system for controlling the temperature of the battery module is adopted separately from a heating and cooling system for indoor HVAC of the vehicle. In other words, two independent cooling and heating systems are built, one of which is used for indoor cooling and heating, and the other of which is used for temperature control of the battery module.

However, when the cooling and heating systems are operated as described above, it is impossible to efficiently manage energy. Thus, the traveling range of the vehicle is shortened, which makes long-distance operation impossible. When cooling is performed in summer, the traveling range may be reduced by 30% or more, and when heating is performed in winter, the traveling range may be reduced by 40% or more. Therefore, the winter heating problem, which is not a problem affecting internal combustion engines, becomes more serious in electric vehicles. When a high-capacity PTC heater is installed to solve the problems caused by heating in winter, the cost and weight may become excessive due to the reduction of traveling range and the use of a heat pump.

It should be understood that the foregoing description of the background art is provided merely for the purpose of promoting the understanding of the background of the present disclosure, but is not intended to acknowledge that the present disclosure corresponds to the prior art that has already been known to those skilled in the art.

SUMMARY

The present disclosure solves the problems described above, and an aspect of the present disclosure is to provide an HVAC system of a vehicle, in which an integrated thermal management module is configured so as to replace a conventional complicated coolant circuit of an electric vehicle and a heat pump system, which is separately configured to recover waste heat, so that a material cost and weight can be prevented from increasing excessively, and a reduction in the traveling range can be avoided.

In accordance with an aspect of the present disclosure, an HVAC system of a vehicle according to the present disclosure includes: a battery line thermally interconnecting a first radiator and a high-voltage battery core and having a first pump connected therethrough such that a coolant flows in the battery line; a refrigerant line having a compressor, a condenser, and an evaporator, the refrigerant line having refrigerant that flows in the refrigerant line; an indoor cooling line thermally interconnecting an indoor HVAC cooling core and the evaporator and having a second pump connected therethrough such that the coolant flows in the indoor cooling line; an indoor heating line thermally interconnecting an indoor HVAC heating core and a condenser and having a third pump connected therethrough such that the coolant flows in the indoor heating line; battery cooling lines branching from opposite side points of the high-voltage battery core in the battery line, respectively, and connected to the indoor cooling line such that the coolant, which has exchanged heat with the evaporator, flows to the high-voltage battery core; battery heating lines branching from the opposite side points of the high-voltage battery core in the battery line, respectively, and connected to the indoor heating line such that coolant, which has exchanged heat with the condenser, flows to the high-voltage battery core; and a first valve disposed at one of the opposite branching points in the battery line and configured to control flow of coolant in the battery line, the indoor cooling line, and the indoor heating line.

The indoor cooling line may have a low-temperature heat exchanger so as to exchange heat with the evaporator in the refrigerant line.

The indoor cooling line may have a second valve, and may include an outside air cooling line, one end of which branches from the second valve and a remaining end of which is connected to the first radiator and is then connected to the indoor cooling line.

The indoor cooling line and the outside air cooling line may selectively connect the first radiator, the low-temperature heat exchanger, and the indoor HVAC cooling core by the second valve, thereby performing cooling of the high-voltage battery core or indoor cooling.

The outside air cooling line may have a fourth valve, and may further include an electric component cooling line, one end of which branches from the fourth valve and a remaining end of which is connected to the third radiator and is then connected to the outside air cooling line. An electric component core may be disposed on the electric component cooling line.

The electric component cooling line may have a fourth pump that is driven or stopped by a control unit.

In a case of an outside air cooling mode, the control unit may control the first valve and the fourth valve to circulate the coolant in the battery line and the electric component cooling line, so that the high-voltage battery core may be cooled by the first radiator, and the electric component core may be cooled by the third radiator.

In a case where a temperature of outside air is relatively low in a battery heating mode, the controller may operate the compressor to circulate the refrigerant in the refrigerant line and may control the first valve, the second valve, and the fourth valve so that the refrigerant line and the electric component core may be thermally connected to each other and thus waste heat from the electric component core may be recovered. A portion of the indoor heating line thermally connected to the refrigerant line may be connected to the battery heating line and the battery line, so that the coolant heated by the recovered waste heat may be circulated, thereby heating the high-voltage battery core.

In a case where a temperature of outside air is relatively high in a battery heating mode, the controller may operate the compressor to circulate the refrigerant in the refrigerant line and may control the first valve, the second valve, and the fourth valve, so that the coolant may be circulated in the electric component cooling line, the coolant line and the electric component core are thermally connected to each other, and thus waste heat from the electric component core may be recovered. A portion of the indoor heating line thermally connected to the refrigerant line may be connected to the battery heating line and the battery line, so that the coolant heated by the recovered waste heat may be circulated, thereby heating the high-voltage battery core.

In a case where a temperature of outside air is relatively low in an indoor heating mode, the controller may operate the compressor to circulate the refrigerant in the refrigerant line and may control the first valve, the second valve, and the fourth valve so that the refrigerant line and the electric component core may be thermally connected to each other and thus waste heat from the electric component core may be recovered. The coolant heated by the recovered waste heat may be circulated in the indoor heating line thermally connected to the refrigerant line, thereby performing indoor heating.

In a case where a temperature of outside air is relatively high in an indoor heating mode, the controller may operate the compressor to circulate the refrigerant in the refrigerant line and may control the first valve, the second valve, and the fourth valve, so that the coolant may be circulated in the electric component cooling line, and the coolant line and the electric component core may be thermally connected to each other, and thus waste heat from the electric component core may be recovered. The coolant heated by the recovered waste heat may be circulated in the indoor heating line thermally connected to the refrigerant line, thereby performing indoor heating.

The indoor heating line may have a high-temperature heat exchanger so as to exchange heat with the condenser in the refrigerant line.

The indoor heating line may have a third valve, and may include an outside air heating line, one end of which branches from the third valve and a remaining end of which is connected to the second radiator and is then connected to the indoor heating line.

The indoor heating line and the outside air heating line may selectively connect the second radiator, the high-temperature heat exchanger, and the indoor HVAC heating core via the third valve, thereby performing heating of the high-voltage battery core or indoor heating.

In a case of a battery cooling mode, the control unit may operate the compressor to circulate the refrigerant in the refrigerant line, may control the first valve and the third valve to circulate the coolant in the outside air heating line thermally connected to the refrigerant line, and may connect the battery cooling line thermally connected to the refrigerant line to the battery line and a portion of the indoor cooling line, so that the cooled coolant may be circulated to perform cooling of the high-voltage battery core.

In a case of an indoor cooling and battery cooling mode, the control unit may operate the compressor to circulate the refrigerant in the refrigerant line, may control the first valve and the third valve to circulate the coolant in the outside air heating line thermally connected to the refrigerant line, and may connect the battery cooling line thermally connected to the coolant line to the battery line and a portion of the indoor cooling line, so that the coolant may be circulated in the indoor cooling line, thereby performing indoor cooling and cooling of the high-voltage battery core.

In a case of an indoor heating mode, the control unit may operate the compressor to circulate the refrigerant in the refrigerant line, may control the third valve to circulate the coolant in the outside air heating line thermally connected to the refrigerant line, and may circulate the coolant in the indoor cooling line thermally connected to the coolant line, thereby performing indoor cooling.

In a case of a dehumidification mode, the control unit may operate the compressor to circulate the refrigerant in the refrigerant line, may control the third valve to circulate the coolant in the indoor heating line thermally connected to the refrigerant line, and may circulate the coolant in the indoor cooling line thermally connected to the coolant line, thereby performing dehumidification.

The indoor HVAC cooling core and the indoor HVAC heating core may be located at adjacent points.

The indoor heating line may further include a water heater controlled by the control unit.

According to an HVAC system of a vehicle configured as described above, it is possible to reduce the material cost and weight of the HVAC system by configuring an integrated thermal management module for replacing a coolant circuit having a complicated configuration of a conventional electric vehicle and a heat pump system separately configured to recover waste heat. Further, the integrated thermal management module is configured as a secondary loop, thereby being formed to be compact which is advantageous in layout, and enabling the HVAC system to be compact.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereinafter, an HVAC system of a vehicle according to an embodiment of the present disclosure will be described with reference to the accompanying drawings.

Figure 1:
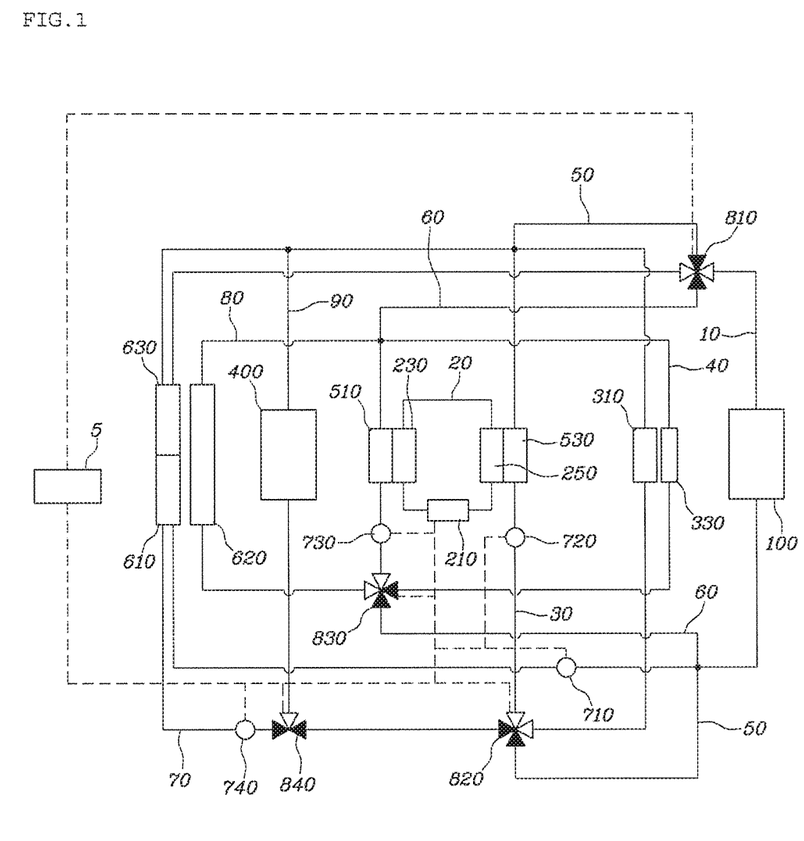
FIG. 1 is a view illustrating an HVAC system of a vehicle according to an embodiment of the present disclosure.
Figure 7:
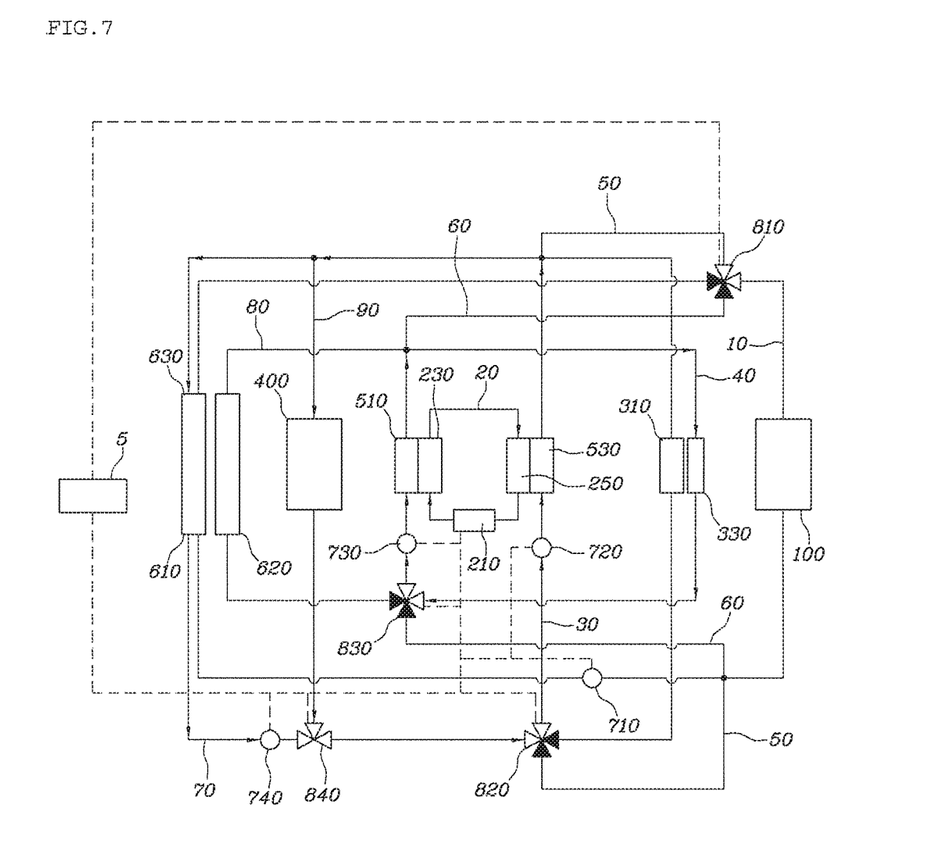
FIG. 7 is a view illustrating an indoor heating mode.
Figure 8:
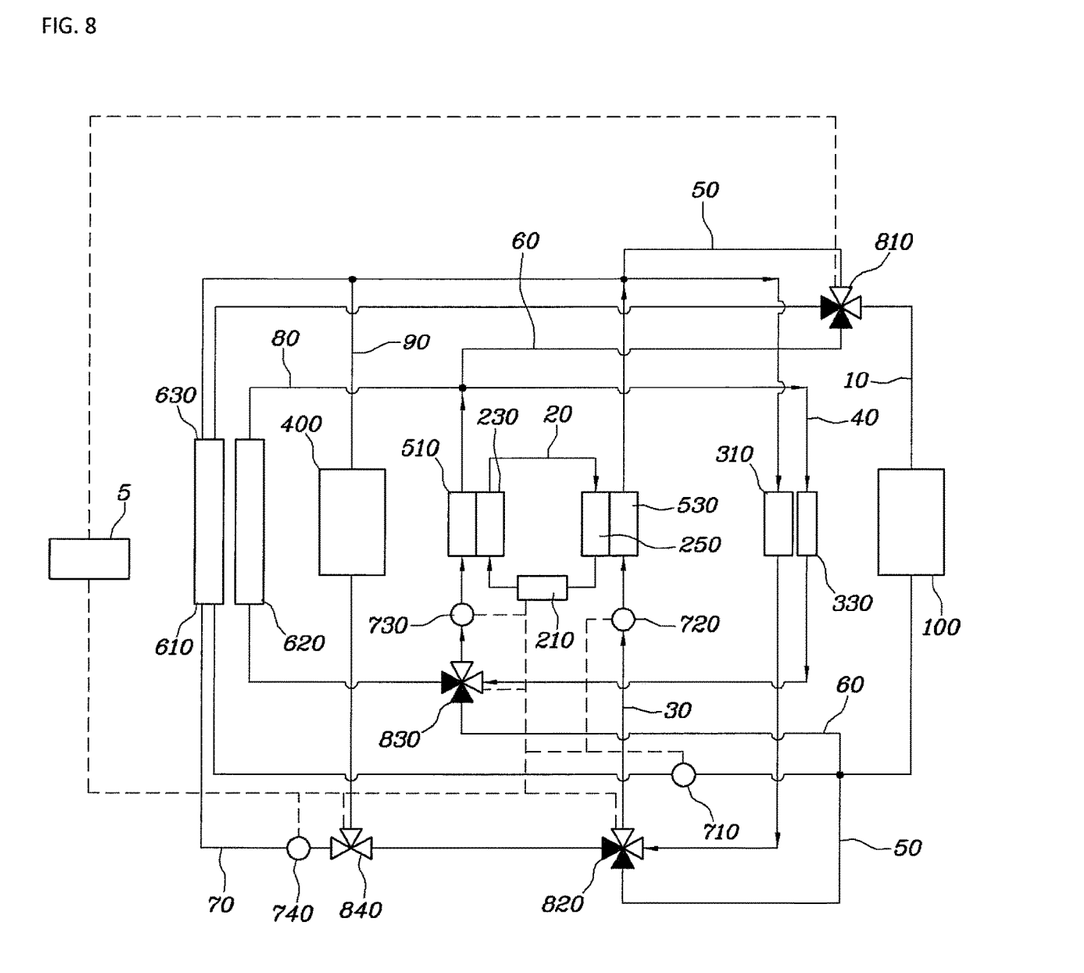
FIG. 8 is a view illustrating a dehumidification mode.
Figure 9:
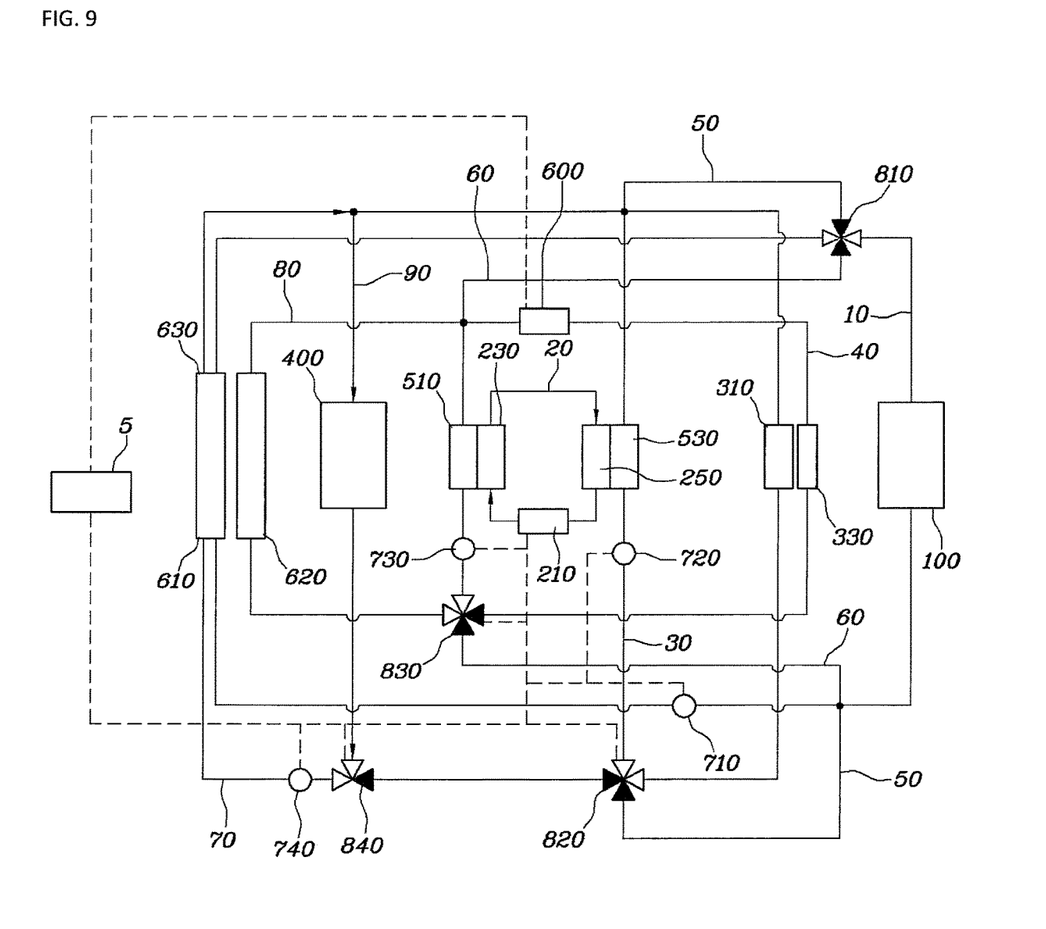
FIG. 9 is a view illustrating an HVAC system of a vehicle according to another embodiment of the present disclosure.

FIG. 1 is a view illustrating an HVAC system of a vehicle according to an embodiment of the present disclosure, FIGS. 2 to 8 are views illustrating flows of coolant in respective modes of the HVAC system of FIG. 1, and FIG. 9 is a view illustrating an HVAC system of a vehicle according to another embodiment of the present disclosure.

As illustrated in FIG. 1, according to an embodiment of the present disclosure, an HVAC system of may include: a battery line 10 configured to thermally interconnect a first radiator 610 and a high-voltage battery core 100 and provided with a first pump 710 such that coolant flows in the battery line 10; a refrigerant line 20 having a compressor 210, a condenser 230, and an evaporator 250 and configured such that refrigerant flows in the refrigerant line 20; an indoor cooling line 30 thermally interconnecting an indoor HVAC cooling core 310 and the evaporator 250 and provided with a second pump 720 such that the coolant flows in the indoor cooling line 30; an indoor heating line 40 thermally interconnecting an indoor HVAC heating core 330 and a condenser 230 and provided with a third pump 730 such that the coolant flows in the indoor heating line 40; battery cooling lines 50 branching from opposite side points of the high-voltage battery core 100 in the battery line 10, respectively, and connected to the indoor cooling line 30 such that the coolant, which has exchanged heat with the evaporator 250, can also flow to the high-voltage battery core 100; battery heating lines 60 branching from the opposite side points of the high-voltage battery core 100 in the battery line, respectively, and connected to the indoor heating line 40 such that the coolant, which has exchanged heat with the condenser 230, can also flow to the high-voltage battery core 100; and a first valve 810 provided at one of the opposite branching points in the battery line 10 and configured to control the flow of coolant in the battery line 10, the indoor cooling line 30, and the indoor heating line 40.

More specifically, the battery line 10 is provided. with the high-voltage battery core 100, and is also provided with the first radiator 610 configured to cool the high-voltage battery core 100 using outside air, and the first pump 710 controlled to be driven or stopped by a control unit 5 and configured to circulate the coolant.

In the refrigerant line 20 provided with the compressor 210, the condenser 230, and the evaporator 250, the refrigerant circulates such that the refrigerant line 20 is thermally connected to the other lines. The refrigerant line 20 also includes an expansion valve (not illustrated), which is not described in this specification.

The compressor 210 is controlled to be driven by the control unit 5, so that the refrigerant can exchange heat with the other lines through heat radiation and heat absorption while circulating through the compressor 210, the condenser 230, the expansion valve, and the evaporator 250.

The refrigerant line 20 is thermally connected to the indoor cooling line 30 and the indoor heating line 40. The indoor cooling line 30 thermally interconnects the indoor HVAC cooling core 310 and the evaporator 250 of the refrigerant line 20, and has the second pump 720 controlled to be driven and stopped by the control unit 5 and configured to circulate the coolant and the second valve 820 controlled by the control unit 5 so as to selectively connect flow paths or to control a flow rate. Particularly, the indoor cooling line 30 is provided with a low-temperature heat exchanger 530 and is thermally connected to the refrigerant line 20 by exchanging heat with the evaporator 250 of the refrigerant line 20. In addition, the indoor cooling line 30 further includes an outside air cooling line 70, one end of which branches from the second valve 820, and the other end of which is connected to the first radiator 610 and is then connected to the indoor cooling line 30. Accordingly, the indoor cooling line 30 and the outside air cooling line 70 selectively connect the first radiator 610, the low-temperature heat exchanger 530, and the indoor HVAC cooling core 310 by the second valve 820 so as to perform the cooling of the high-voltage battery core 100 or indoor cooling. The outside air cooling line 70 is provided with a fourth valve 840, which is controlled by the control unit to selectively connect flow paths or to control a flow rate. In addition, the outside air cooling line 70 further includes an electric component cooling line 90, one end of which branches from the fourth valve 840 and the other end of which is connected to the third radiator 630 and then is connected to the outside air cooling line 70, so as to perform cooling of an electric component core 400, or to perform heating of the high-voltage battery core 100 by recovering heat generated from the electric component core 400. Particularly, the electric component cooling line 90 is provided with a fourth pump 740 that is driven or stopped by the control unit 5, so that the coolant in the electric component cooling line 90 and the outside air circulation line is circulated.

The indoor heating line 40 thermally interconnects the indoor HVAC heating core 330 and the condenser 230 of the refrigerant line 20, and is provided with the third pump 730 controlled to be driven and stopped by the control unit and configured to circulate the coolant and the third valve 830 controlled by the control unit 5 so as to selectively connect flow paths. Particularly, the indoor heating line 40 is provided with a high-temperature heat exchanger 510 and is thermally connected to the refrigerant line 20 by exchanging heat with the condenser 230 of the refrigerant line 20. In addition, the indoor heating line further includes an outside air heating line 80, one end of which branches from the third valve 830, and the other end of which is connected to the second radiator 620 and is then connected to the indoor heating line 40. Accordingly, the indoor heating line 40 and the outside air heating line 80 selectively connect the second radiator 620, the high-temperature heat exchanger 510, and the indoor HVAC heating core 330 via the third valve 830 so as to perform the heating of the high-voltage battery core 100 or indoor heating. Particularly, in the present disclosure, the indoor HVAC cooling core 310 and the indoor HVAC heating core 330 may be located at adjacent points.

The battery cooling lines 50 branch from opposite side points of the high-voltage battery core 100 in the battery line 10, respectively, and are connected to the indoor cooling line 30, so that the coolant, which has exchanged heat with the evaporator 250, can also flow in the high-voltage battery core 100. The battery heating lines 60 branch from opposite side points of the high-voltage battery core 100 in the battery line 10, respectively, and are connected to the indoor heating line 40, so that the coolant, which has exchanged heat with the condenser 230, can also flow in the high-voltage battery core 100. Particularly, the first valve 810 is provided at one of the opposite branching points of the battery line 10 so as to adjust the flow of the coolant of the battery line 10, the indoor cooling line 30, and the indoor heating line 40. However, since the flow of the coolant can be controlled through the second valve 820, the third valve 830, and the fourth valve 840, the first valve 810 may be omitted in some cases.

The flow of the coolant for each mode controlled by the control unit 5 will be described with reference to the drawings.

Figure 2:
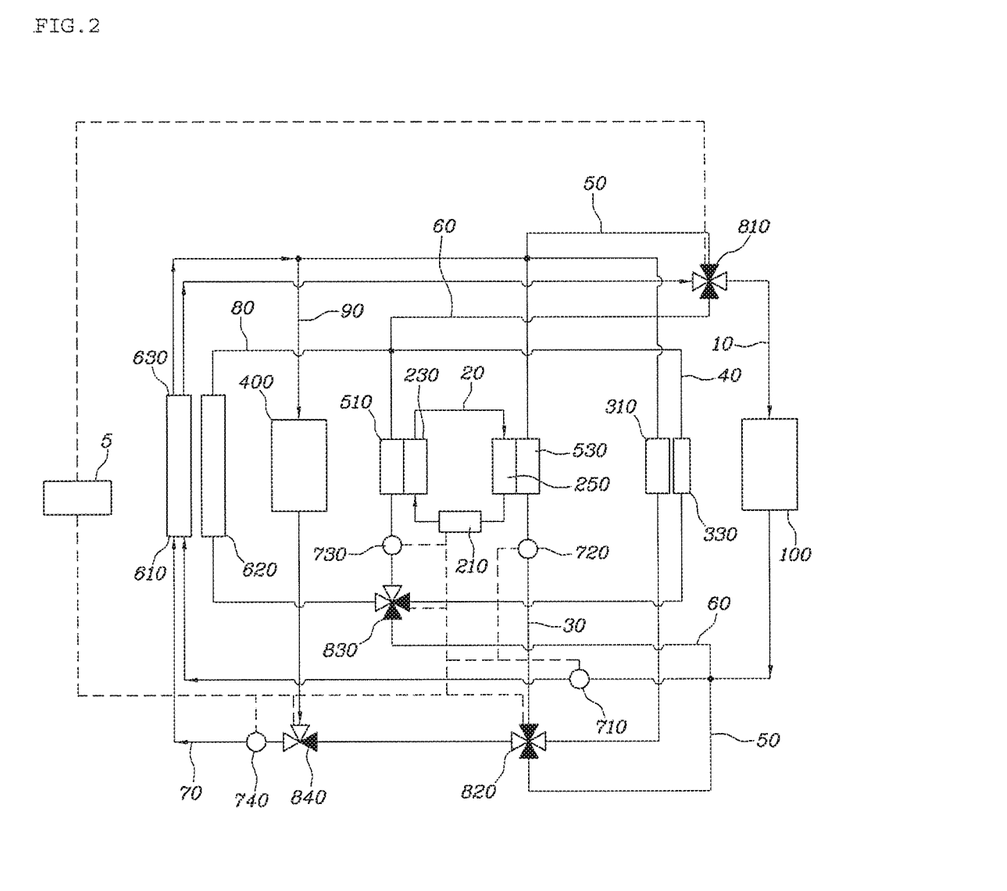
FIG. 2 is a view illustrating an outside air cooling mode of an electric component and a battery.

FIG. 2 is a view illustrating an outside air cooling mode of an electric component and a battery. In the case of an outside air cooling mode, the control unit 5 controls the first valve 810 and the fourth valve 840 to circulate the coolant through the battery line 10 and the electric component cooling line 90, so that the high-voltage battery core 100 is cooled by the first radiator 610 and the electric component core 400 is cooled by the third radiator 630. Accordingly, the coolant is circulated in the battery line 10 by the first valve 810, and the coolant, which has been cooled by heat exchange with the outside air in the first radiator 610, cools the high-voltage battery core 100. In addition, the coolant, which has been circulated in a line interconnecting a portion of the outside air cooling line 70 and the electric component cooling line 90 by the fourth valve 840 and has been cooled by heat exchange with the outside air in the third radiator 630, cools the electric component core 400.

Figure 3:
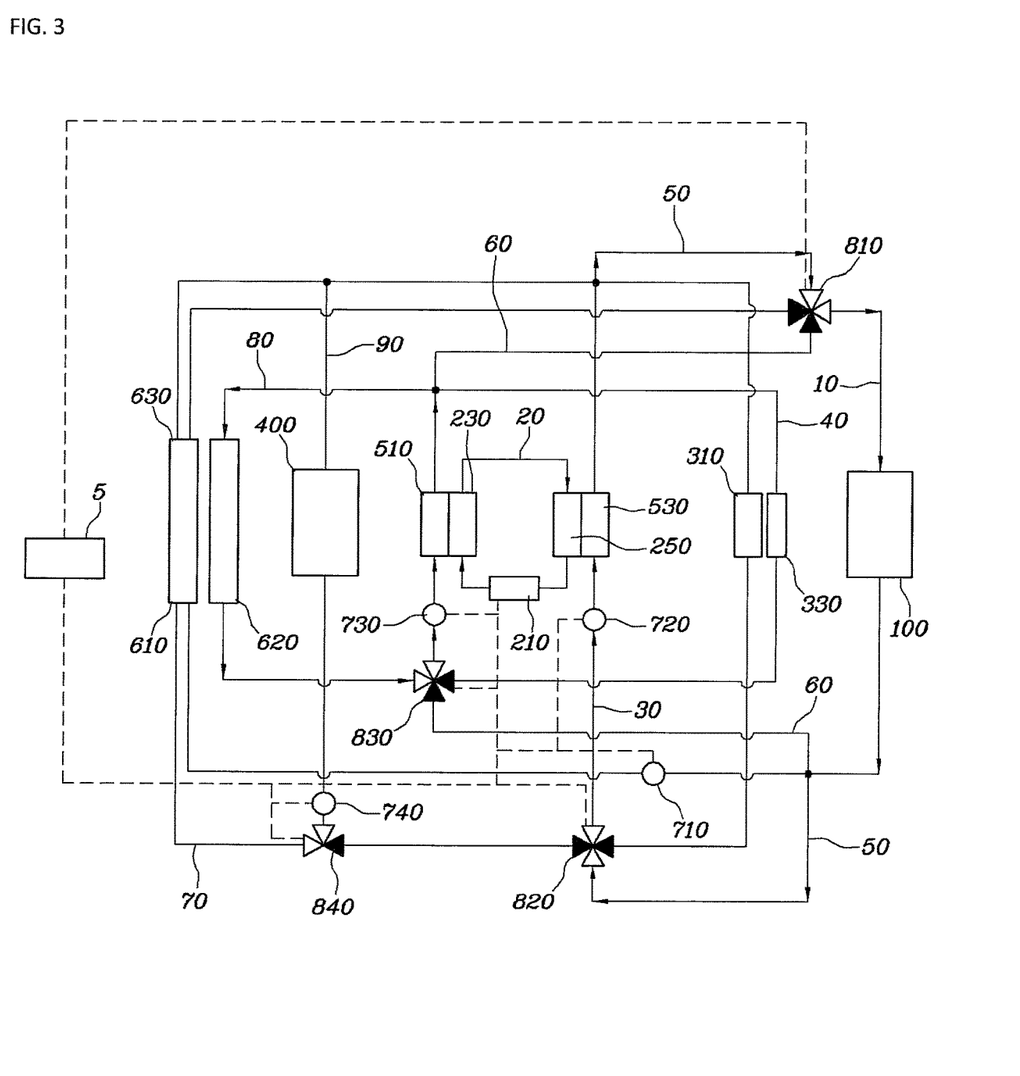
FIG. 3 is a view illustrating a battery cooling mode.

FIG. 3 is a view illustrating a battery cooling mode. In the case of the battery cooling mode, the control unit 5 operates the compressor 210 to circulate the refrigerant in the refrigerant line 20, and controls the first valve 810, the second valve 820, and the third valve 830 to circulate the coolant in the outside air heating line 80, which is thermally connected to the refrigerant line 20, and to connect the battery cooling line 50, which is thermally connected to the refrigerant line 20, to the battery line 10. That is, the high-temperature heat exchanger 510 provided in the outside air heating line 80 and the condenser 230 in the refrigerant line 20 exchange heat with each other so as to be thermally connected to each other, and the coolant heated in the high-temperature heat exchanger 510 is cooled by exchanging heat with the outside air in the second radiator 620 and is then circulated in the high-temperature heat exchanger 510 again. Accordingly, cooling of the high-voltage battery core 100 is performed by circulating the coolant by connecting a portion of the indoor cooling line 30, which is provided with the low-temperature heat exchanger 530, the battery cooling line 50, and the battery line 10 to each other by the condenser 230, which is thermally connected to the high-temperature heat exchanger 510, thereby circulating the cooled coolant.

Figure 4:
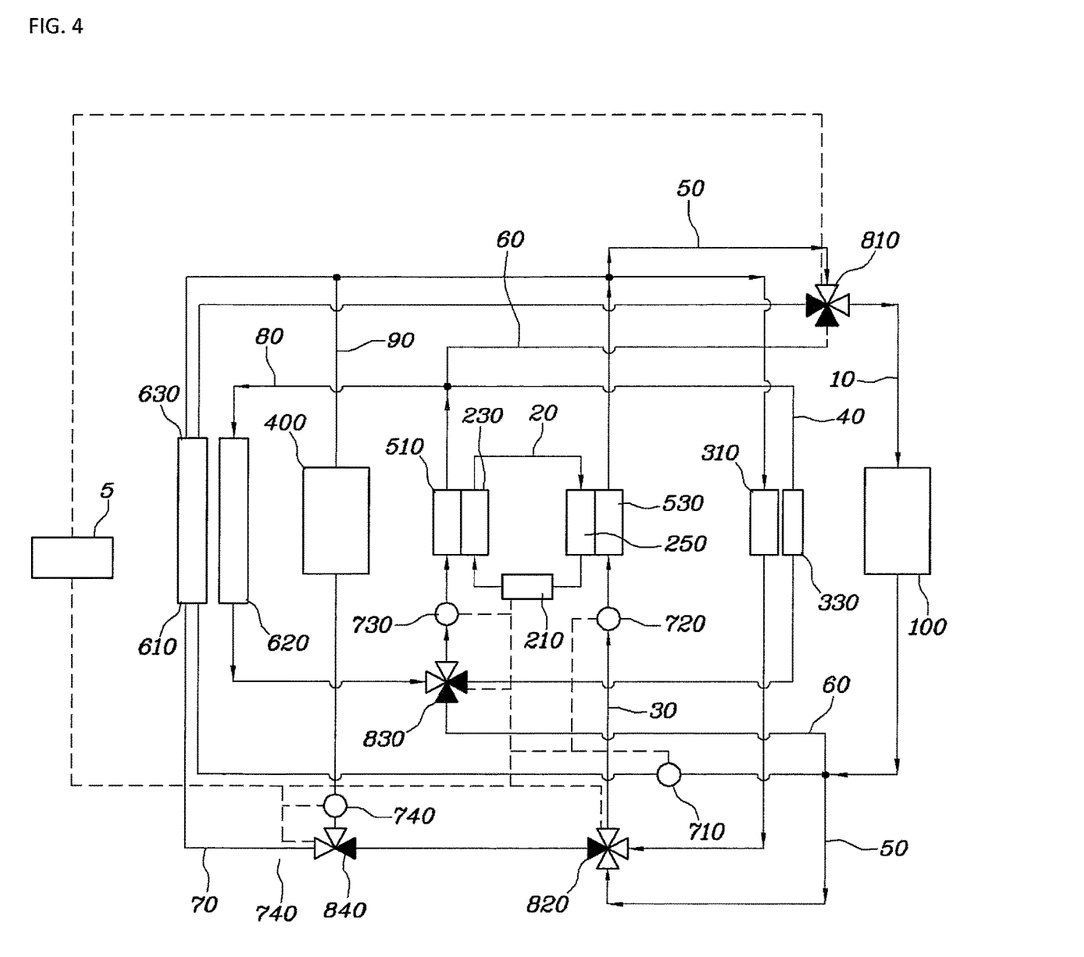
FIG. 4 is a view illustrating an indoor cooling and battery cooling mode.

FIG. 4 is a view illustrating an indoor cooling and battery cooling mode. In the case of the indoor cooling and battery cooling mode, the control unit 5 operates the compressor 210 to circulate the refrigerant in the refrigerant line 20, and controls the first valve 810, the second valve 820, and the third valve 830 to circulate the coolant in the outside air heating line 80, which is thermally connected to the line 20, and to connect the battery cooling line 50, which is thermally connected to the refrigerant line 20, to the battery line 10. That is, the high-temperature heat exchanger 510 provided in the outside air heating line 80 and the condenser 230 in the refrigerant line 20 exchange heat with each other so as to be thermally connected to each other, and the coolant heated in the high-temperature heat exchanger 510 is cooled by exchanging heat with the outside air in the second radiator 620 and is then circulated in the high-temperature heat exchanger 510 again. Accordingly, indoor cooling is performed by circulating the coolant in the indoor cooling line 30, which is provided with the low-temperature heat exchanger 530 by the condenser 230, which is thermally connected to the high-temperature heat exchanger 510, and cooling of the high-voltage battery core 100 is performed by circulating the coolant by connecting a portion of the indoor cooling line 30, the battery cooling line 50, and the battery line 10, thereby circulating the cooled coolant.

Figure 5:
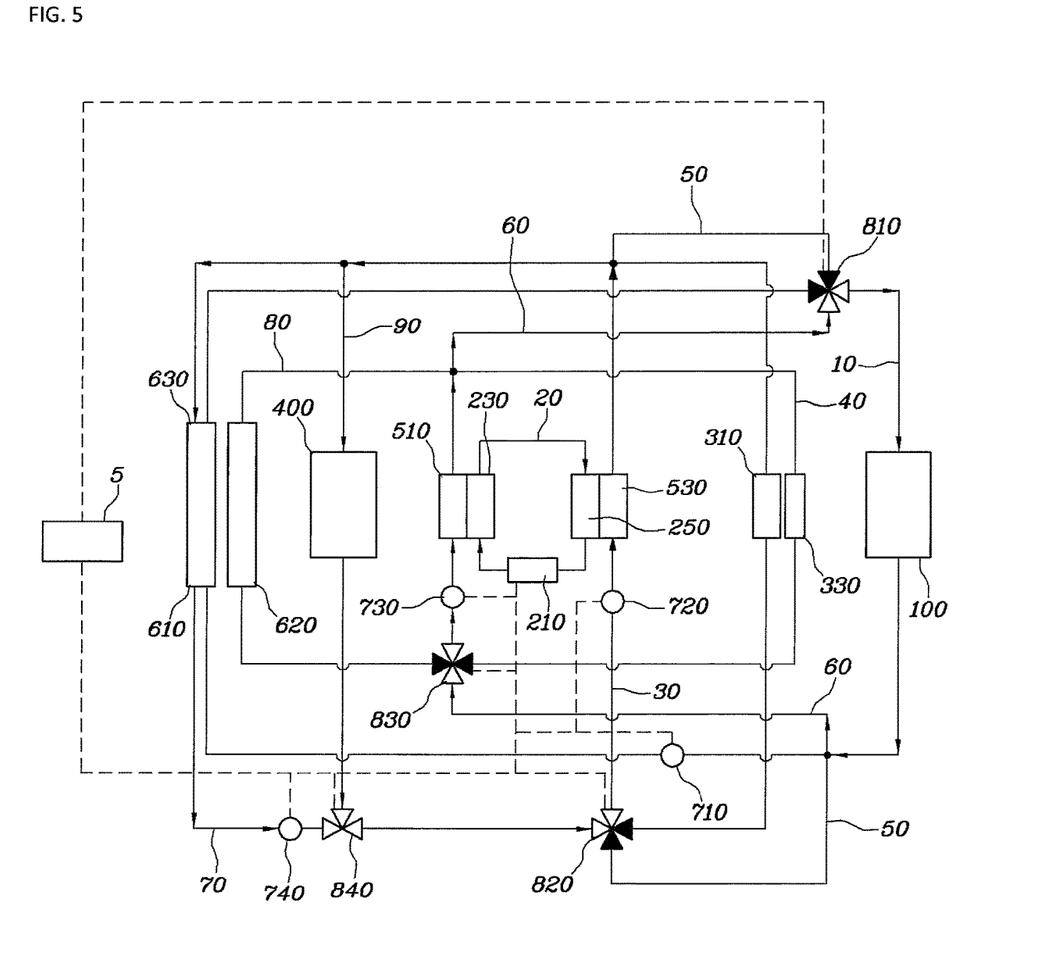
FIG. 5 is a view illustrating a battery heating mode.

FIG. 5 is a view illustrating a battery heating mode. In the battery heating mode, waste heat from the electric component core 400 is recovered so as to heat the battery. First, in the case where the temperature of the outside air is relatively low in the battery heating mode, the control unit 5 operates the compressor 210 to circulate the refrigerant in the refrigerant line 20 and controls the first valve 810, the second valve 820, the third valve 830, and the fourth valve 840. Therefore, the refrigerant line and the electric component core 400 are thermally connected to each other so that the waste heat from the electric component core 400 is recovered, and are connected to a portion of the indoor heating line 40, which is thermally connected to the refrigerant line 20, the battery heating line 60, and the battery line 10, so that the coolant heated by the recovered waste heat is circulated and thus the high-voltage battery core 100 is heated. That is, the coolant is circulated through a portion of the outside air cooling line 70 including the low-temperature heat exchanger 530 and the electric component cooling line 90, thereby cooling the electric component core 400 and recovering the waste heat from the electric component core 400. In addition, the coolant is connected to a portion of the indoor heating line 40 including the high-temperature heat exchanger 510, which is thermally connected to the refrigerant line 20, the battery heating line 60, and the battery line 10, thereby heating the high-voltage battery core 100.

Next, in the case where the temperature of the outside air is relatively high in the battery heating mode, the outside air cooling line 70 is connected such that the coolant is circulated in addition to the case where the temperature of the outside air is relatively low in the battery heating mode, thereby assisting the cooling of the electric component core 400 through the third radiator 630. At this time, the fourth valve 840 is controlled to appropriately distribute the flow rate to the outside air cooling line 70 and the electric component cooling line 90.

Figure 6:
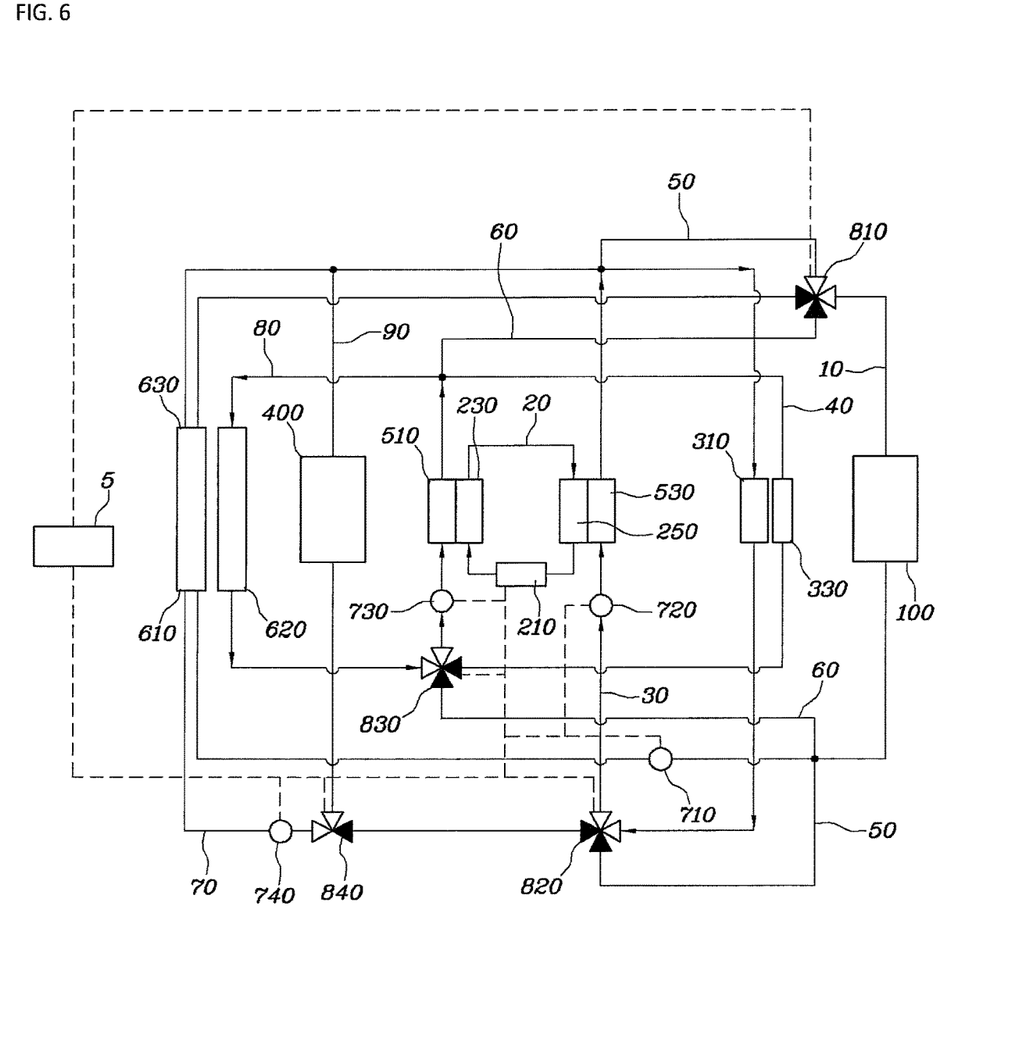
FIG. 6 is a view illustrating an indoor cooling mode.

FIG. 6 is a view illustrating an indoor cooling mode. In the case of the indoor cooling mode, the control unit 5 operates the compressor 210 to circulate the refrigerant in the refrigerant line 20, and controls the second valve 820 and the third valve 830 to circulate the coolant in the outside air heating line 80, which is thermally connected to the refrigerant line 20, and to circulate the coolant to the indoor cooling, line 30, which is thermally connected to the refrigerant line 20. That is, the high-temperature heat exchanger 510 provided in the outside air heating line 80 and the condenser 230 in the refrigerant line 20 exchange heat with each other so as to be thermally connected to each other, and the coolant heated in the high-temperature heat exchanger 510 is cooled by exchanging heat with the outside air in the second radiator 620 and is then circulated in the high-temperature heat exchanger 510 again. Therefore, the coolant is circulated in the indoor cooling line 30, which is provided with the low-temperature heat exchanger 530, by the condenser 230, which is thermally connected to the high-temperature heat exchanger 510, so that the cooled coolant is circulated and thus indoor cooling is performed.

FIG. 7 is a view illustrating an indoor heating mode. First, in the case where the temperature of the outside air is relatively low in the indoor heating mode, the control unit 5 operates the compressor 210 to circulate the refrigerant in the refrigerant line 20 and controls the second valve 820, the third valve 830, and the fourth valve 840. Accordingly, the refrigerant line 20 and the electric component core 400 are thermally connected to each other so that the waste heat from the electric component core 400 is recovered, and the coolant is circulated in the indoor heating line 40, which is thermally connected to the refrigerant line 20 and includes the high temperature heat exchanger 510 and the indoor HVAC heating core 310, thereby performing indoor heating.

Next, in the case where the temperature of the outside air is relatively high in the indoor heating mode, the outside air cooling line 70 is connected such that the coolant is circulated in addition to the case where the temperature of the outside air is relatively low in the battery heating mode, thereby assisting the cooling of the electric component core 400 through the third radiator 630. At this time, the fourth valve 840 is controlled to appropriately distribute the flow rate to the outside air cooling line 70 and the electric component cooling line 90.

FIG. 8 is a view illustrating a dehumidification mode. In the case of the dehumidification mode, the control unit operates the compressor 210 to circulate the refrigerant in the refrigerant line 20, and controls the second valve 820 and the third valve 830 to circulate the coolant in the indoor heating line 40, which is thermally connected to the coolant line 20, and to circulate the coolant to the indoor cooling line 30, which is thermally connected to the refrigerant line 20, thereby performing the humidification.

FIG. 9 is a view illustrating an HVAC system of a vehicle according to another embodiment of the present disclosure, in which the indoor heating line 40 further includes a water heater 600, which is controlled by a control unit 5. Therefore, the coolant in the indoor heating line 40 can be further heated when the vehicle travels in a cold region. In addition, although not separately illustrated, a reservoir tank for supplying coolant may be separately provided on a line to supply coolant.

Therefore, according to the HVAC system of a vehicle of the present disclosure described above, it is possible to reduce the material cost and weight of the HVAC system by configuring an integrated thermal management module for replacing a coolant circuit having a complicated configuration of a conventional electric vehicle and a heat pump system separately configured to recover waste heat. Further, the integrated thermal management module is configured as a secondary loop, thereby being formed to be compact which is advantageous in terms of layout, thus enabling the HVAC system to be compact.

While the present disclosure has been illustrated and explained with respect to specific embodiments thereof, it will be obvious to a person ordinarily skilled in the art that the present disclosure can be variously modified and changed without departing from the scope of the technical idea of the present disclosure, which is defined by the accompanying claims.

What is claimed is:

1. A Heating, Ventilation and Air Conditioning (HVAC) system of a vehicle, comprising:
   a battery line thermally interconnecting a first radiator and a battery core, the battery line having a first pump connected such that a coolant flows in the battery line;
   a refrigerant line having a compressor, a condenser, and an evaporator, the refrigerant line having refrigerant flowing therein;
   an indoor cooling line thermally interconnecting an indoor HVAC cooling core and the evaporator, the indoor cooling line having a second pump connected such that the coolant flows in the indoor cooling line;
   an indoor heating line thermally interconnecting an indoor HVAC heating core and the condenser, the indoor heating line having a third pump connected therethrough such that the coolant flows in the indoor heating line;
   battery cooling lines branching from opposite side points of the battery core in the battery line, respectively, and connected to the indoor cooling line such that the coolant, which exchanges heat with the evaporator, flows to the battery core;
   battery heating lines branching from the opposite side points of the battery core in the battery line, respectively, and connected to the indoor heating line such that coolant, which exchanges heat with the condenser, flows to the battery core; and
   a first valve disposed at one of the opposite branching points in the battery line and configured to control flow of the coolant in the battery line, the indoor cooling line, and the indoor heating line.

2. The HVAC system of claim 1, wherein the indoor cooling line has a low-temperature heat exchanger to exchange heat with the evaporator in the refrigerant line.

3. The HVAC system of claim 2, wherein the indoor cooling line has a second valve, and includes an outside air cooling line, one end of which branches from the second valve and a remaining end of which is connected to the first radiator and is then connected to the indoor cooling line.

4. The HVAC system of claim 1, wherein the indoor cooling line and the outside air cooling line selectively connect the first radiator, the low-temperature heat exchanger, and the indoor HVAC cooling core by the second valve, thereby performing cooling of the battery core or indoor cooling.

5. The HVAC system of claim 3, wherein the indoor heating line has a third valve, a second radiator, and an outside air heating line,
   wherein one end of the outside air heating line branches from the third valve and a remaining end of the outside air heating line is connected to the second radiator and is then connected to the indoor heating line,
   wherein the outside air cooling line has a fourth valve, a third radiator, and an electric component cooling line,
   wherein one end of the electric component cooling line branches from the fourth valve and a remaining end of the electric component cooling line is connected to the third radiator and is then connected to the outside air cooling line, and
   wherein the electric component cooling line has an electric component core connected thereto.

6. The HVAC system of claim 5, wherein the electric component cooling line has a fourth pump that is driven or stopped by a controller.

7. The HVAC system of claim 5, wherein, in a case of an outdoor cooling mode, the controller controls the first valve and the fourth valve to circulate the coolant in the battery line and the electric component cooling line, so that the battery core is cooled by the first radiator, and the electric component core is cooled by the third radiator.

8. The HVAC system of claim 5, wherein the indoor heating line has a high-temperature heat exchanger so as to exchange heat with the condenser in the refrigerant line.

9. The HVAC system of claim 8, wherein the indoor heating line and the outside air heating line selectively connect the second radiator, the high-temperature heat exchanger, and the indoor HVAC heating core via the third valve, thereby performing heating of the h battery core or indoor heating.

10. The HVAC system of claim 8, wherein, in a case of a battery cooling mode, the controller operates the compressor to circulate the refrigerant in the refrigerant line, controls the first valve and the third valve to circulate the coolant in the outside air heating line thermally connected to the refrigerant line, and connects the battery cooling line, which is thermally connected to the refrigerant line, to the battery line and a portion of the indoor cooling line, so that the cooled coolant circulates to perform cooling of the battery core.

11. The HVAC system of claim 8, wherein, in a case of an indoor cooling and battery cooling mode, the controller operates the compressor to circulate the refrigerant in the refrigerant line, controls the first valve and the third valve to circulate the coolant in the outside air heating line which is thermally connected to the refrigerant line, and connects the battery cooling line thermally connected to the refrigerant line to the battery line and a portion of the indoor cooling line, so that the cooled coolant circulates in the indoor cooling line, thereby performing indoor cooling and cooling of the battery core.

12. The HVAC system of claim 11, wherein, in a case of an indoor cooling mode, the controller operates the compressor to circulate the refrigerant in the refrigerant line, controls the third valve to circulate the coolant in the outside air heating line thermally connected to the refrigerant line, and circulates the coolant in the indoor cooling line thermally connected to the refrigerant line, thereby performing indoor cooling.

13. The HVAC system of claim 1, wherein, in a case of a dehumidification mode, the controller operates the compressor to circulate the refrigerant in the refrigerant line, controls the third valve to circulate the coolant in the indoor heating line thermally connected to the refrigerant line, and circulates the coolant in the indoor cooling line that is thermally connected to the refrigerant line, thereby performing dehumidification.

14. The HVAC system of claim 1, wherein the indoor HVAC cooling core and the indoor HVAC heating core are adjacent to each other.

15. The HVAC system of claim 1, wherein the indoor heating line further includes a water heater controlled by the controller.

* * * * *